Oct. 25, 1966

F. G. CRIDER 3,280,910

HEATING OF A SUBTERRANEAN FORMATION

Filed March 20, 1964

$T = 540°R$
FOR A GIVEN PORE RADIUS:

$$P_{n+i} = P_n \left(\frac{T_n}{T_{n+i}}\right)^{0.55}$$

$P_n$ = PRESSURE OF COMBUSTIBLES AT $n^{th}$ FLASH COMBUSTION
$T_n$ = TEMPERATURE OF " " " " " (ABSOLUTE UNITS)
$P_{n+i}$ = PRESSURE OF COMBUSTIBLES AT SUBSEQUENT FLASH COMBUSTION
$T_{n+i}$ = TEMPERATURE OF " " " " "
(ABSOLUTE UNITS)

% = VOL % GASEOUS FUEL (NAT. GAS UNLESS OTHERWISE NOTED)
IN AIR. (NATURAL GAS = 0.88 $CH_4$, .06 $C_2H_6$, +)

$K = 0.4 \phi R^2$
$K$ = PERMEABILITY IN md
$\phi$ = POROSITY IN PERCENT
$R$ = MEAN PORE RADIUS IN MICRONS

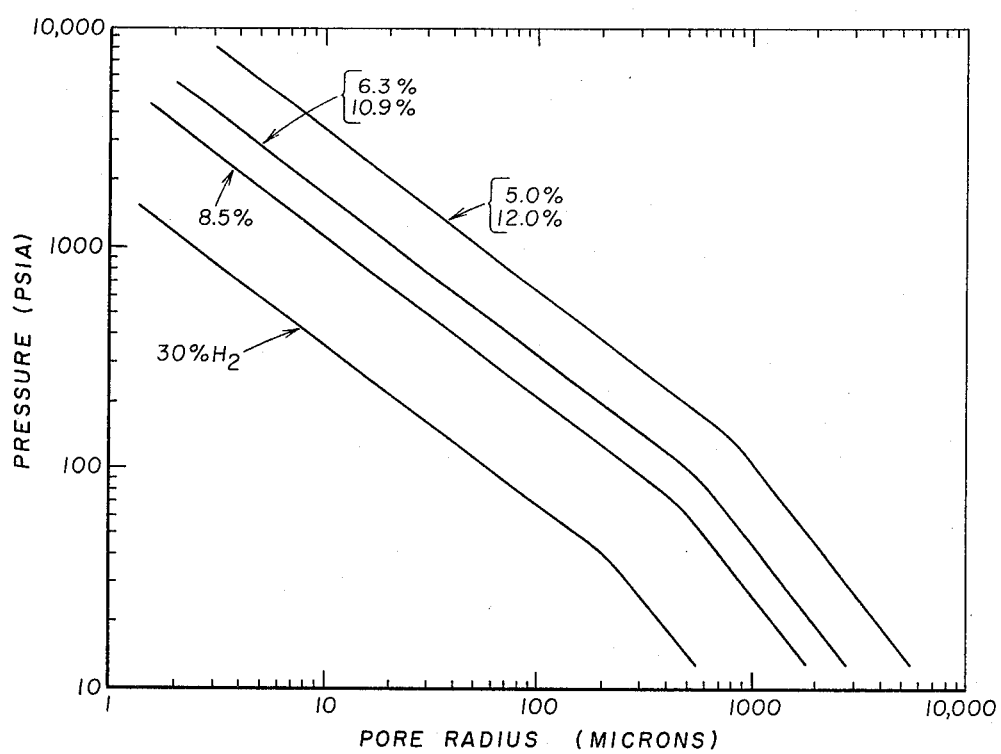

FIG. 1

FRETWELL G. CRIDER
INVENTOR.

BY James C. Fails

PATENT AGENT $T = 540°R$
FOR A GIVEN FISSURE WIDTH:

$$P_{n+i} = P_n \left(\frac{T_n}{T_{n+i}}\right)^{0.55}$$

$P_n$ = PRESSURE OF COMBUSTIBLES AT $n^{\underline{th}}$ FLASH COMBUSTION
$T_n$ = TEMPERATURE OF      "        "      "     "       "      (ABSOLUTE UNITS)
$P_{n+i}$ = PRESSURE OF COMBUSTIBLES AT SUBSEQUENT FLASH COMBUSTION
$T_{n+i}$ = TEMPERATURE OF     "        "      "     "       "
(ABSOLUTE UNITS)

% = VOL % GASEOUS FUEL (NAT. GAS UNLESS OTHERWISE NOTED)
    IN AIR. (NATURAL GAS = 0.88 $CH_4$, .06 $C_2H_6$, +)

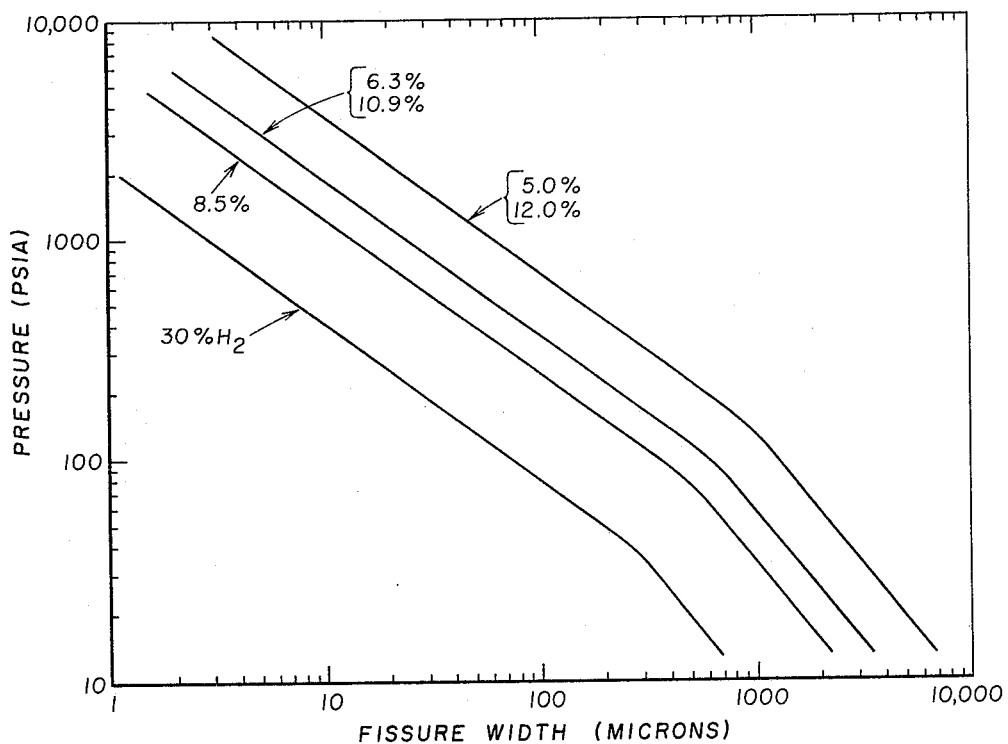

FIG. 2

FRETWELL G. CRIDER
INVENTOR.

BY James C. Fails

PATENT AGENT

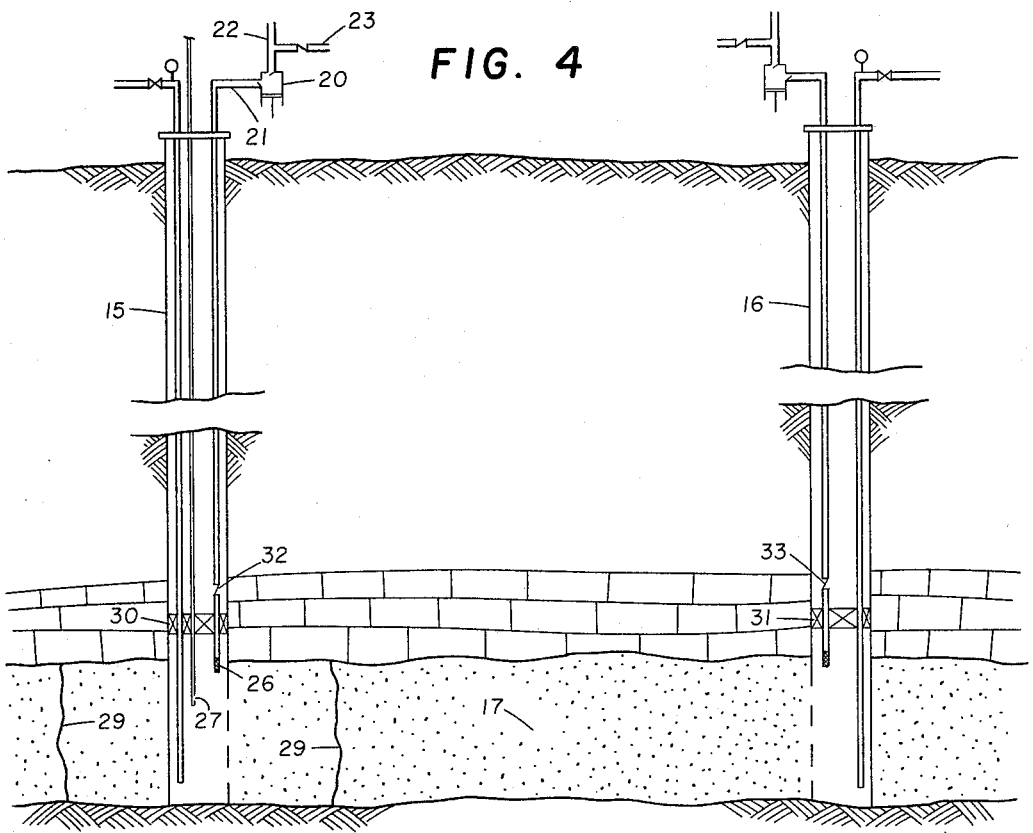
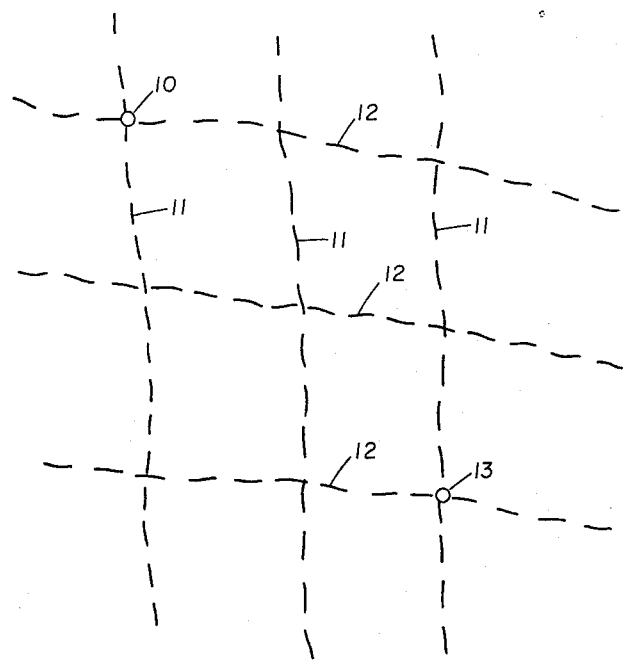

3,280,910
HEATING OF A SUBTERRANEAN FORMATION
Fretwell G. Crider, Arlington, Tex., assignor to Mobil Oil Corporation, a corporation of New York
Filed Mar. 20, 1964, Ser. No. 353,330
18 Claims. (Cl. 166—11)

This invention relates to a method of heating a subterranean formation. More particularly, the invention is directed to heating a subterranean formation to increase the recovery of hydrocarbonaceous materials therefrom.

Hydrocarbonaceous material being made up of compounds which are composed primarily of hydrogen and carbon includes such diverse materials as petroleum or oil, tarlike hydrocarbons from tar sands, natural gas, and kerogen, a substance found in oil shales. Kerogen is a normally solid hydrocarbonaceous material having a minor content of nitrogen and sulfur.

Petroleum is usually produced from a well or wells drilled into the subterranean formations in which it is found. A well is producing when it is flowing fluids. The verb "to produce" is used in oil field terminology to mean to vent, to withdraw, to flow, etc., pertaining to the passage of fluids from wells.

There are many hydrocarbonaceous materials which cannot be produced directly through wells completed within the subterranean formation in which the materials occur. Some supplemental operation is required for production. At least three such materials are the kerogen in the oil shales, the tarlike hydrocarbon in the tar sands, and the highly viscous crude oil in the oil-containing formations. These materials have at least one thing in common—heat can bring about the necessary conversion or viscosity lowering to enable the hydrocarbonaceous material to be produced from its environment.

Recently, a process involving in-situ burning, sometimes called in-situ combustion or fire flood, has been used successfully in heating subterranean formations. Therein, at least an oxygen-containing gas is injected into an injection well. A portion of the hydrocarbons is burned in situ to create a high temperature front which can be moved slowly through the formation. In forward in-situ combustion, this high temperature front sweeps the hydrocarbons before it while the hot gases and hydrocarbons, in turn, convey heat to the formation in advance thereof. The fluids flow into and are produced from production wells thereabout. There has occurred a very severe problem, however, where the formation is relatively impermeable or where the liquids are relatively viscous, or both. This problem is known as liquid blocking. Because of liquid blocking, the usual in-situ method of heating is often ineffective in the three materials discussed above.

Liquid blocking is simply the building up of a bank of liquid hydrocarbons and water in advance of the combustion front. In this way, permeability is dramatically reduced. Excessively high pressures become necessary for continued injection at the high rates desired. This reduction in permeability prevents the injection of adequate quantities of air to support the combustion front and the result is that the combustion front is extinguished.

Past attempts to solve this problem have included the so-called inverse burning technique. In the inverse burning technique, air or an oxygen-containing gas is injected into a first well. The hydrocarbon is ignited in another well and burns toward the first well. The liquid bank is forced toward the ignition well by the pressure gradient. Liquid hydrocarbons must flow through the region of high temperature before proceeding into the ignition well. This results in coking and excessive consumption of hydrocarbon product. In addition, the heat of combustion is conveyed into the heated formation where its heat is not as useful as in forward in-situ combustion.

In oil-containing formations, it is customary to think of production in at least two stages. The first or primary stage is the production of the oil using the original energy drive mechanism of the formation, e.g., gas cap, solution gas, or water drive. This lasts at least until the producing characteristics of the formation are analyzed and subsequent operations are designed.

The second stage is the implementation of the designed operations. In many secondary operations, a fluid is injected in one or more injection wells and flowed through the formation to one or more production wells thereabout. The production well is used to produce the fluids from the formation. The injected fluid determines the name of the secondary operation. If dry gas is injected in order to maintain pressure or to sweep the formation, it is called gas drive. If higher molecular weight components such as ethane, propane, or butane are added, it is called enriched gas drive. If liquids are injected and driven through the formation, the recovery operations are called floods. If miscibility is maintained in the formation, the liquid injection is referred to as miscible floods. An example is liquefied petroleum gases driven by natural gas. If miscibility is not maintained, the floods are referred to as immiscible floods. An example is a waterflood where water is the injected fluid. Of course, there are numerous combinations of these production operations.

In most of these secondary injected fluid operations, a liquid bank is established ahead of the injected fluid. A liquid bank is a concentration of liquids ranging from the in-situ crude oil to the injected fluid. As the composition changes, so does the viscosity grade from that of the in-situ crude to that of the injected fluid. This viscosity gradation can be an asset under certain conditions. For example, if the viscosity is sufficiently low for the fluids to have good mobility in the particularly formation, viscosity gradation will minimize unstable bulging, which is called instability fingering and which causes premature breakthrough of the driving fluid. This is especially true of the operations wherein a miscible fluid is injected.

The liquid bank can be a liability also. It causes a lowering of the injectivity rate per unit pressure, i.e., the ratio of the rate of injection in volume per unit of time divided by the pressure at the injection well. In these operations, no back pressure is held at the production wells so the injection pressure is an indication of the pressure drop through the formation. The liquid bank becomes a liquid block when this decrease in injectivity rate per unit pressure becomes severe enough. The magnitude of the decrease indicates the mobility of the liquids in the reservoir, i.e., permeability of the reservoir divided by viscosity of the liquid. Decreases in the injectivity rate per unit pressure up to 50 percent can be tolerated. If the ratio becomes as low as 10 percent of the initial ratio, trouble can be predicted in continued operation of the secondary recovery process. Pressure can only be increased within limits, e.g., equipment capacity or formation fracture pressure, to offset the decrease in injectivity. Therefore, measures should be taken to prevent the trouble. Since very little can be done economically to modify the permeability of the reservoir, the measures are limited to modifying the viscosity of the oil.

In the past, a high percentage of viscous oil has not been recovered from subterranean formations. Gas drives and enriched gas drives were notoriously unsuccessful in such reservoirs. Even secondary recovery methods such as miscible or immiscible flooding did not effect significantly greater recovery in such cases because of liquid blocking of the front, or leading edge, of such floods. Decreasing the viscosity of the in-situ oil, e.g., by heating, can (1) help to alleviate the problem of liquid blocking, (2) convert the liquid block to an asset which will achieve increased sweep efficiency through viscosity gradation, and (3) improve the recovery of any secondary operation.

Accordingly, it is an object of the invention to provide a method of controllably and uniformly heating a subterranean formation.

It is also an object of the invention to reduce the viscosity of hydrocarbonaceous material in a subterranean formation.

It is another object of the invention to provide uniform, controlled heating in situ to achieve the beneficial effects of evenly applied thermal energy to increase the recovery of hydrocarbonaceous material from subterranean formations in which it occurs.

It is another object of the invention to provide uniform, controlled heating to increase the recovery of hydrocarbonaceous material from oil shale.

It is another object of the invention to provide uniform, controlled heating to increase the recovery of hydrocarbonaceous material from tar sands.

It is another object of the invention to provide uniform, controlled heating to increase the recovery of crude oil from a reservoir containing viscous crude oil.

It is also an object of this invention to employ such uniform, controlled heating in subterranean formations to improve the recovery obtainable by a secondary recovery technique.

It is a further object of the invention to employ uniform, controlled heating in subterranean formations to alleviate or prevent liquid blocking and thus extend the number of formations amenable to secondary recovery techniques and to enhance the recovery realizable by such techniques.

Broadly, the invention provides a method of heating a subterranean formation having small passageways running therethrough and communicating with at least two wells penetrating into the formation which comprises cyclically injecting through at least one of the wells and flash burning in the formation a combustible mixture above a minimum or critical pressure necessary to sustain flash burning in the formation to heat uniformly and controllably the formation, and intermittently withdrawing in cooperative relationship with the injecting and the flash burning, fluids and combustion products from the formation through at least one other well.

In addition to being able to heat uniformly and controllably the subterranean formation, the invention is useful as a recovery mechanism for recovering hydrocarbonaceous materials from a subterranean formation in which it occurs. The invention also extends the range of formation and hydrocarbon combinations to which secondary recovery operations can be applied successfully. The following detailed description of the invention will be given with particular emphasis on the latter embodiments of the invention.

FIGURE 1 is a plot of the available pore radius versus minimum or critical pressure required to sustain flash burning in an oil-containing subterranean formation.

FIGURE 2 is a plot of fissure width versus minimum or critical pressure required to sustain flash burning for a formation having fractures or fissures therein.

FIGURE 3 is a plan view of one quadrant of a typical 5-spot recovery pattern illustrating one embodiment of the invention carried out in a shale oil formation.

FIGURE 4 is an elevation of an injection well and a production well illustrating another embodiment of the invention.

Flash burning, also called flash combustion or flash heating, is chemical oxidation wherein the oxidation front moves rapidly through a combustible mixture, generally a gaseous fuel and an oxidizing gas. It is analogous to an explosion since the combustion front moves so very rapidly and distributes the chemical heat of reaction uniformly throughout the volume occupied by the combustible mixture.

It has long been thought that flash burning could not be carried out in consolidated porous media having very restricted, tortuous passageways of small dimensions. The operation of the invention demonstrates the contrary. A combustible mixture, such as oxygen and natural gas, is injected into an injection well penetrating a subterranean formation. The natural gas is a gaseous fuel composed primarily of methane with minor percentages of ethane, propane, and other constituents. A typical composition is given in later examples. A production well which has been completed in the formation and which is in communication via small passageways through the formation with the injection well is produced until the combustible mixture is produced thereat. By injecting in the injection well and cooperatively producing from the production well, the pressure is increased to achieve a pressurized combustible mixture at the production well. When the pressure is sufficiently high, the combustible mixture is ignited by suitable means such as a spark gap. The combustible mixture will flash burn throughout the portion of the formation it occupies, thereby heating the adjacent formation and any fluids contained therein from 5° to 25° F., depending on the amount of combustible mixture in the interstices or passageways of the formation.

In formations of a granular nature, the combustible mixture flash burns in the open spaces between grains. These open spaces are interconnected in a permeable formation of small passageways called pores. Combustible gases and air will burn in these spaces and pores if the pressure of the combustible gas mixture is above a minimum pressure known as the critical pressure for flash burning in the porous medium.

The primary factor which controls the pressure to which the combustible mixture must be raised before it will flash burn is the distance between the faces bordering on the small passageway. Thus, the critical pressure is dependent upon the physical characteristics of the formation.

A secondary factor is temperature. Raising the temperature decreases the critical pressure required. In operation of the invention where the temperature in absolute units is not changed appreciably, its effects can be disregarded.

Combustible mixtures of gaseous paraffin fuels having a higher molecular weight than methane also have a slightly lower critical pressure, but the effect can be disregarded for practical purposes. The concentration of fuel in the combustible mixture exerts a more appreciable effect on the minimum pressure required as can be seen in FIGURE 1 and FIGURE 2. The relationship is illustrated further in later specific examples.

Increasing the concentration of oxygen in the oxidizing gas lowers the critical pressure required for flash burning in a porous medium for any given oxygen-fuel ratio by decreasing the amount of inert gases. For commercial operations, enriching the oxygen content of the combustible mixture does not appear to lower the minimum pressure enough to be economically feasible. However, it has application in enabling small scale flash burning in a volume of lowered permeability around a well, or to initiate flash burning in the formation. Once initiated, the rapid movement of the flash burning front increases the localized pressure immediately ahead of it. Hence, once started, flash burning can propagate at pressures slightly lower than that necessary for initiation.

The minimum or critical pressure may be determined empirically. One such empirical method is described below.

A combustible mixture is injected in at least a first well completed in the subterranean formation. One or more second wells are produced at a preselected pressure by a suitable back-pressure device, e.g., a back-pressure control valve. When the combustible mixture is produced at the second well and the pressure thereon reaches the preselected pressure, the combustible mixture is ignited adjacent the formation in the well. While the mixture may be ignited at either well, the pressure will be higher at the first well and the likelihood of flash burning through the formation is slightly increased if the first well is chosen as the ignition well. In such a case, the second well serves as an alternate well.

The combustible mixture in the well will burn. To prevent damage to the well equipment, a heat-resistant, downhole packer and pressure-operated control valve is provided to confine the burning to the region adjacent the formation. Such safety construction is known in the art. Its use is preferred in the embodiments described hereinafter. If the pressure is sufficiently high, the combustible mixture will flash burn through the formation. A thermistor or pressure transducer in the alternate well responds to the increase in temperature or pressure, respectively, to indicate whether flash burning is propagated through the formation from the ignition well to the alternate well. If there is no flash burning through the formation, the combustion products created by burning in the ignition well are produced therefrom and the ignition well shut in again. The pressure at the second well is increased by a suitable increment by continued injection at the first well. Upon attaining this increased preselected pressure, the combustible mixture is again ignited in one of the wells. The flash burning through the formation is again monitored in the alternate well. If no flash burning is propagated through the formation, the above procedure is repeated.

The preselected pressure will depend on the general type of subterranean formation in which the process is being carried out. If the subterranean formation requires flash burning in a fissure or fracture, the preselected pressure may be as low as 100 p.s.i.a. (pounds per square inch absolute). The suitable increment would be 50 p.s.i.a. increase thereafter. Such a preselected pressure range would be used in such formations as the Colorado oil shales, and the Athabasca tar sands wherein a fracture had been created between wells. If the subterranean formation is an oil-containing reservoir wherein the combustible mixture must flash burn in very small diameter pores, a preselected pressure of at least 1000 p.s.i.a. will be used. Suitable increments thereafter would be 100 p.s.i.a. increases.

If flash burning is propagated from the ignition well to the alternate well, the combustible mixture can be ignited on subsequent cycles, if they are desired, at least when the pressure again reaches this preselected pressure. Ignition should be attempted at lower pressures to ascertain the true minimum pressure necessary. This prevents wasting energy attaining unnecessarily high pressures before flash burning.

The number of cycles necessary will depend on the desired mobility increase. Each cycle will result in an increase in temperature of from 5° to 25° F. Generally, from 20° to 100° F. will achieve the desired increase in mobility. Hence, from 1 to 4 cycles will generally be adequate.

The combustible mixture will flash burn through the formation on slightly lower pressures than that required on the initial injection and ignition. This is due to the increasing temperature of the formation and the in-situ hydrocarbonaceous materials after each cycle.

There are several ways of carrying out the foregoing invention. To cooperatively produce the second well, any one of the specific embodiments for achieving distribution of the combustible mixture at a preselected pressure from the injection well to the alternate well through the formation may be employed. One way of accomplishing this is to open the second or production well when injection is started in the first or injection well and produce from the production well until the combustible mixture is produced thereat. At this time, the production well is closed or shut in and the injection of a combustible mixture into the injection well continued. The pressure will thus increase to a preselected pressure. At this point, the remaining steps of the invention can be carried out. Successive cycles following the ignition and propagation of the flash burning through the formation are achieved simply by opening the production well and repeating the above cycle.

An alternative approach is to inject the combustible mixture at an elevated pressure. In such a case, the second or production well is cooperatively produced by maintaining a back pressure at least equal to the preselected pressure. For example, the production well is produced only when the pressure thereat is equal to or greater than the minimum pressure necessary to sustain flash burning in the formation. Gases produced are more soluble at elevated pressure and help increase the mobility of the fluids within the formation. In this manner, the combustible mixture can be ignited when it reaches the production well. Successive cycles are carried out by cooperatively producing the production well at the preselected pressure following the flash burning through the formation and injecting in the injection well between ignitions. These successive cycles can be continued until the desired reduction in viscosity of the in-situ hydrocarbonaceous materials has been achieved. Alternatively, they may be continued to achieve production through the cracking, conversion, or liberation of absorbed gases. As a practical limit, however, the temperature to which the subterranean formation is heated will be less than that at which the oxidation of the in-situ hydrocarbons becomes appreciable, e.g., about 400° F. in the case of petroleum.

Another way in which the critical pressure can be determined or preselected is through the use of FIGURE 1 or FIGURE 2. The minimum or critical pressure is shown in FIGURE 1 as a function of the radius of the small passageways or pores in an oil-containing formation. The minimum or critical pressure is shown in FIGURE 2 as a function of the width of the fissure or fracture in which the flash burning must occur.

In oil-containing formations, the passageways are tortuous and diverse. However, generically, they can be referred to as having a mean pore radius or diameter. There are empirical relations available which relate the conventionally determined porosity and permeability of a consolidated oil-containing formation to a mean pore radius. One satisfactory relationship is given by the equation:

$$K=(0.4)\phi R^2$$

where:

$K$=permeability in millidarices,
$\phi$=porosity in percent, and
$R$=mean pore radius in microns.

Applying this formula to a consolidated sandstone core having 400-millidarcy permeability and 20 percent porosity, the mean radius of the pore space would be equal to approximately 7 microns.

The mean radius of the pore space which is calculated by the above method is used to delineate the pressure in p.s.i.a. which is necessary to propagate flash burning in the matrix of a reservoir. This is shown in FIGURE 1. In the case of the 400-millidarcy sandstone formation above, the mean pore radius of 7 microns would necessitate a pressure of approximately 2200 p.s.i.a. to sustain flash burning using 6.3 percent natural gas in air. A typical composition of natural gas is 88 mol percent $CH_4$, 6.5 mol percent $C_2H_6$ plus minor amounts of other gases. If stoichiometric concentration of natural gas, about 8.5 percent, is used, flash burning can be sustained as low as 1450 p.s.i.a. In contrast, 5 percent or 12 percent natural gas in air would require 4200 p.s.i.a. to flash burn in such a formation. Thirty percent hydrogen in air will flash burn in this formation at critical pressures as low as 460 p.s.i.a. Interpolation of combustible mixture composition is possible in using FIGURE 1 as an empirical guide in carrying out the method of the invention.

Mean pore size is an average as the name implies. The vast majority of formations in the United States have pores of both larger radii and smaller radii. The magnitude of variation is related by $\sqrt{2}$, i.e., the radii of the larger pores are approximately 1.4 R. If enough of these larger pores are present and interconnected, it is possible to sustain flash burning at lower pressures. In the example cited, wherein a sandstone having 7-micron mean pore radius, it is possible that a pore radius of $(1.4)$ $(7) \cong 10$ microns would be determinative of the critical pressure, i.e., a 6.3 percent natural gas-in-air mixture would flash burn as low as 1700 p.s.i.a. instead of 2200 p.s.i.a. This can be determined empirically by igniting the combustible mixture adjacent the formation when the pressure on the combustible mixture reaches the lower value, e.g., 1700 p.s.i.a. in the example cited.

Using the same basic physical principle, flash burning can be performed in narrow passageways such as fissures or fractures running through an otherwise essentially impermeable formation such as the Mahogany Zone of the Parachute Creek Section of the Green River oil shale of Colorado. The dimensions of these fissures or fractures may be measured by taking physical measurements, such as impressions on an expandable soft rubber core lowered into a borehole, or by sonic techniques. Alternatively, they may be calculated through injection profiles. Once the dimension of the fissure is known, or has been estimated, the pressure shown in FIGURE 2 is used as a minimum or critical pressure to which an injected combustible mixture must be raised to sustain flash burning in these fissures or fractures running through the otherwise impermeable formation.

In the Colorado oil shales these fissures are native to the Mahogany Zone shales. They may be induced by hydraulic fracturing techniques where they do not occur naturally. The minimum or critical pressure is determined from the width of the fissures, plotted as the abscissa in FIGURE 2. For example, if the fissures are as wide as 100 microns, 6.3 percent natural gas in air will flash burn therein if pressured above 370 p.s.i.a. A stoichiometric mixture of natural gas and air, about 8.5 percent natural gas, will flash burn at pressures above 240 p.s.i.a. As the fissure width decreases, the pressure required to sustain flash burning increases.

A shown in FIGURE 2, the composition of the combustible mixture also changes the critical pressure required to sustain flash burning. Stoichiometric mixtures flash burn at the lowest pressure. Progressively leaner or richer mixtures require higher pressures. Interpolation of combustible mixtures composition is possible in using FIGURE 2.

The particular gaseous fuel selected will also effect the minimum pressure required. For example, 30 percent hydrogen in air would flash burn in the above 100-micron fissure at pressures as low as 80 p.s.i.a. The gaseous fuels in the paraffin series have critical pressure requirements very nearly the same and much more dependent on the concentration of fuel in the fuel-air mixture. For practical purposes, natural gas or methane will be the gaseous fuel selected.

The invention may be carried out in any subterranean formation containing a hydrocarbonaceous material and having connectedly interspersed therein and in communication with at least one injection well and at least one production well, narrow passageways, pores, fissures, or fractures. The detailed description of the embodiment is made primarily with respect to recovering shale oil from the kerogen occupying the Mahogany Zone oil shale of Colorado.

Referring to FIGURE 3, a combustible mixture is injected into injection well 10. The combustible mixture which may be, for example, a normally gaseous hydrocarbon and oxygen-containing gas, permeates the fissures or fractures 11 and 12 and will enter or be produced at production well 13 at some later time. Once the combustible mixture enters or is produced at production well 13, well 13 is closed. The injection of the combustible mixture into injection well 10 is continued until the pressure at production well 13 reaches a pressure greater than or equal to the minimum or critical pressure necessary to sustain flash burning in the subterranean formation. This critical pressure is determined empirically by either of the foregoing methods, e.g., ignition adjacent the formation of from FIGURE 2.

When pressurized to the critical pressure, the combustible mixture is ignited by suitable means, e.g., spark gap 27 in FIGURE 4. The burning front flashes back through the formation, uniformly distributing the heat of combustion. Because of the nature of the flash burning, it is immaterial whether the combustible mixture is ignited in injection well 10 or production well 13. During the later stages of the process, it may be more convenient to ignite at injection well 10 so both flash burning and pressure gradient tend to drive fluids toward production well 13.

The amount of thermal energy supplied by each cycle of flash burning is adequate only to raise the temperature of the formation adjacent the zone wherein the flash burning occurs approximately 5° to 25° F. It will be necessary to repeat the above-described procedure to supply the heat necessary to convert the hydrocarbonaceous material to a flowable form. This is especially true of the kerogen native to the shale since the conversion of the kerogen will require temperatures in excess of 500° F.

Successive cycles may be initiated by opening production well 13 and continuing the injection of the combustible mixture into injection well 10. The pressure gradients thus established will sweep the products of combustion, and any fluids produced, through the formamation and into production well 13 where they are produced to the surface. In this manner the subterranean formation will be recharged with combustible gas which is in turn ignited for flash burning through the formation. After each cycle, comprised of injection, ignition, burning and the release of pressure in the formation, hydrocarbonaceous liquids and gases will flow through the formation under the pressure gradients established and be produced from production well 13 once the formation temperature is high enough. Gas evolved under the high temperature provides motive power for fluid movement, even when there is no injection into the injection well. By this means, hydrocarbonaceous material is produced during or between cycles.

Subsequent cycles will ignite at slightly lower pressures because of the increase in temperature. This may be insignificant in terms of the amount of lowering between each cycle. However, between the first cycle at an absolute temperature of, e.g., 540° R., and the latter ones at, e.g., 1080° R., the critical pressure required will be decreased as shown on FIGURE 2, i.e., $$P_{n+i} = P_n \left(\frac{T_n}{T_{n+i}}\right)^{0.5i}$$

where:
$P_n$ = pressure of combustible mixture at $n^{th}$ flash burning cycle,
$P_{n+i}$ = pressure of combustible mixture at $n+i^{th}$ flash burning cycle,
$T_n$ = temperature, in absolute units, of combustible mixture at $n^{th}$ flash burning cycle, and $T_{n+i}$ = temperature, in absolute units, of combustible mixture at $n+i^{th}$ flash burning cycle.

Thus, as calculated:

$$P_{n+i} = (240 \text{ p.s.i.a.})\left(\frac{540° \text{ R.}}{1080° \text{ R.}}\right)^{0.55}$$

$$= 240\left(\frac{1}{2}\right)^{0.55} = 240(.726)$$

$$= 174 \text{ p.i.s.a.}$$

The critical pressure thus decreases from 240 p.s.i.a. for a stoichiometric combustible mixture of natural gas in air to 174 p.s.i.a. under the effects of the increased temperature in the same formation.

The invention is useful in oil-containing reservoirs also, as previously discussed. The mechanics of carrying out the process are essentially the same as disclosed above and discussed in detail with respect to the recovery of hydrocarbonaceous material from the kerogen of oil shales. The minimum pressure necessary to sustain flash burning may be determined empirically by either of the foregoing methods, e.g., ignition adjacent the formation or from FIGURE 1.

The required temperature increase in a conventional oil-containing formation will be much less than the temperature increase necessary for the conversion and recovery of kerogen and its products. Thus, the temperature effects in lowering the critical pressure for flash burning are not as significant as in the oil shale, although they operate in favor of the process of the invention.

The method of the invention can also be applied to recovery of hydrocarbons from tar sands. The permeability in tar sands is so low, approximately 20 millidarcies, that the minimum pressure necessary to sustain a flash burning in the tar sands under virgin conditions is greater than the resistance of the tar sands to fracturing. Thus, in the application of the invention, communication between wells drilled thereinto is achieved by fracturing therebetween. A suitable propping agent is deposited therein. A combustible mixture is flash burned in the propped open fracture at fairly low pressures in accordance with the method outlined for use in the oil shales of Colorado. The minimum pressure necessary to sustain flash burning is determined empirically by either igniting adjacent the tar sand or from the dimensions of the fissure or fracture in accordance with FIGURE 2.

The invention has been described heretofore as an independent method of recovering hydrocarbonaceous material from subterranean formations under special circumstances. The invention is also useful as an adjunct to another secondary recovery operation. As discussed above, an embodiment of the invention is useful in reducing the viscosity of in-situ oil to prevent or cure liquid blocking problems, to increase mobility, to decrease instability fingering, and to improve sweep efficiency. The invention thus extends the range of formation and hydrocarbon combinations to which a secondary recovery operation can be applied successfully by the steps of injecting a combustible mixture into the formation before or during the secondary recovery operation, raising the pressure to a predetermined minimum or critical pressure adequate to sustain flash burning in the formation, and igniting the pressurized combustible mixture to obtain flash burning throughout the formation to thus lower the viscosity of the in-situ hydrocarbons and prevent the formaton of a liquid block which would normally render the secondary recovery process inoperative or unsuccessful.

One embodiment, which incorporates the invention with regard to the in-situ burning in which liquid blocking problems can occur, is described below. It is a method of recovering hydrocarbons from a subterranean formation having at least one injection well and at least one production well completed therein and where the formation is sufficiently impermeable or the hydrocarbons are sufficiently viscous to render a normal in-situ burning recovery inoperative. The embodiment comprises the steps of:

(a) Initiating in-situ burning by injecting, at an injectivity rate per unit pressure, at least a combustion-supporting gas into the injection well, (b) When the injectivity rate per unit pressure falls below a level indicating liquid blocking, injecting a combustible mixture containing a gaseous fuel and oxygen into the production well and flowing through the formation until produced at the injection well, (c) Closing the injection well and continuing the injection of step (b) until at least a minimum pressure adequate to sustain flash burning in the formation is reached at the injection well, (d) Igniting the combustible mixture to effect a flash burning whereby the liquid block and in-situ hydrocarbons are heated from 5° to 25° F. and rendered more mobile, (e) Repeating steps (b), (c), and (d) until the temperature is raised between 20° and 100° F., and (f) Cyclically repeating steps (a), (b), (c), (d), and (e) as necessary to bring about more nearly complete recovery of relatively viscous hydrocarbons from the subterranean formation.

The following more detailed description of the above embodiment is also given with reference to an in-situ burning recovery technique, although it is readily apparent that the principles can be applied to other secondary recovery operations such as miscible or immiscible flooding. Referring to FIGURE 4, an injection well 15 and a production well 16 penetrate a subterranean formation 17 which contains a viscous crude oil. An oxygen-containing gas such as air is introduced by means of compressor 20 through line 21 to formation 17. This air is mixed with a fuel gas for at least sufficient time to provide a combustible mixture for igniting the oil in formation 17. Fuel gas is introduced to line 22 from line 23. There is some hazard in compressing a combustible mixture under such an arrangement. Alternatively, line 23 may inject gas directly into the formation so burning is impossible before the gas reaches the formation. An arrester 26 on the lower end of line 21 prevents flashback when the combustible mixture is ignited as by electric spark at spark gap 27. After the oil in formation 17 is ignited, introduction of fuel gas via line 23 is discontinued since only the oxygen-containing gas is necessary to sustain burning. There is a specific injectivity rate per unit pressure at this time. A burning zone designated as front 29 in FIGURE 4 is moved toward production well 16 until pressure increases and the injectivity rate decreases too much as discussed earlier. This indicates that a bank of oil has formed, through which it is difficult to move the produced liquids as well as the products of combustion. The distance through which the burning front travels between the ignition of the in-situ oil and the development of the liquid block, i.e., when the burning zone has reached the position indicated by front 29, depends on the viscosity of the oil and the permeability of the formation. For example, in certain known formations, the liquid block will form when the burning zone is within a radial distance of about ten feet from injection well 15.

At this time, i.e., when the injectivity rate per unit pressure falls below a predetermined level, e.g., below about 10 percent of the original value, injection of oxygen-containing gas alone, via injection well 15, is discontinued. A combustible mixture of a gaseous fuel and an oxygen-containing gas is then injected into formation 17 via production well 16. The equipment and piping arrangement will be the same as discussed for injecting into injection well 15.

It is preferred that the injection of the combustible mixture be at a pressure great enough whereby a flash burning will be effected when the combustible mixture reaches the high temperature zone at front 29 from the previous in-situ burning. This can be realized by the positive step of holding at injection well 15 a back pressure sufficiently great, e.g., as shown in FIGURE 1 and discussed above, to sustain flash burning in the formation. In the first cited example of the 400-millidarcy sandstone having a porosity of 20 percent, a pressure of 2200 p.s.i.a. is maintained at injection well 15 if a 6.3 percent natural gas-in-air combustible mixture is being injected. The foregoing general discussions and variations are pertinent to the back pressure held as the minimum pressure necessary to sustain flash burning in the particular formation.

The embodiment is advantageous in that the burning which may accompany the arrival of the combustible mixture at the hot zone 29 will increase the pressure. If the injection is continued, this burning will automatically change into flash burning which will flash back through the permeable formation into well 16 when the minimum pressure necessary to sustain flash burning is reached. Each flash burning cycle is easily monitored by a pressure transducer at, or thermistor in, the original production well. Thus, in practical operation the carrying out of this embodiment of the invention may be readily effected. Heat-resistant packers 30 and 31, along with pressure-operated control valves 32 and 33, serve to confine the burning in the well to the region adjacent the formation.

Once a flash burning occurs with such continuous injection, it is only necessary to produce well 15 and purge the products of burning from the formation, along with any hydrocarbons which may be produced to repeat the cycle. Back pressure is held on well 15 during such production.

Alternatively, the injection may be continued, not only to flow the combustible mixture into the vicinity of the hot formation of zone 29, but to produce fluids out of injection well 15 at a lowered pressure. In such case, it will then be necessary to shut injection well 15 and to raise the pressure above that minimum pressure shown in FIGURE 1 necessary to sustain flash burning in the particular formation.

The same general comments which were pertinent to the method of the invention as a primary recovery technique are applicable when used as an adjunct to secondary recovery. They apply to the degree of heating, the advisability of multiple cycles, and the embodiments which can be used in the method of the invention.

After heating the formation by these one or more flash burning steps, injection of oxygen-containing gas intermixed with fuel gas via well 16 is discontinued. The in-situ burning process, illustrative of any secondary recovery process, is again started. Oxygen-containing gas is reintroduced via well 15 to formation 17, and burning zone 29 is moved toward well 16 by direct in-situ burning drive, at least until such time as viscous oil again builds up in advance of the burning front as indicated by the falling of the injectivity rate per unit pressure. Upon this reoccurrence, the above-described flash heating cycles can be repeated as described.

While the foregoing description has been directed specifically to in-situ burning, it is apparent that such flash heating is useful in advance of or during other secondary recovery techniques such as miscible or immiscible flooding. The particular embodiment to be used may be chosen from among those described above.

It is intended that descriptions and claims made with regard to one well of a particular type include use of more than one well when the size of the operation makes the use of multiple wells economically advisable.

The invention thus provides a uniform, controlled heating within the formation. This heating can be used to effect conversion, distillation, and lowering of the viscosity without suffering the disadvantages of methods of the prior art when recovering hydrocarbonaceous materials from formations in which they occur. The invention obtains the advantages of inverse burning without suffering from the defects of localized high temperatures and excessive fuel consumption. It affords the advantages of conventional in-situ burning wherein useful heat is supplied to a hydrocarbon-containing formation which has not been heated by the burning front.

In addition, the empirical determination of the minimum or critical pressure at which flash burning can be achieved through the formation affords engineering information on the mean pore size distribution or dimensions of passageways through the formation. Such information is useful in designing the type of recovery operation which is most effective in a particular subterranean formation.

It will be readily apparent that numerous modifications will occur to one skilled in the art as with any new recovery technique. It is intended to cover those modifications which fall within the scope of the appended claims.

What is claimed is:
1. A method of recovering hydrocarbons from a subterranean formation containing hydrocarbonaceous material, and having small passageways runing therethrough and communicating with at least two wells penetrating into the formation, which comprises the steps of:
  (a) injecting through a first one of the wells a gaseous combustible mixture,
  (b) cooperatively producing a second of the wells until said combustible mixture reaches said second well,
  (c) upon achieving a preselected pressure at said second well, discontinuing said injecting of step (a),
  (d) igniting said combustible mixture in one of said wells,
  (e) upon propagation of a flash burning through said formation, repeating steps (a), (b), (c), and (d) until said hydrocarbonaceous material becomes flowable and hydrocarbons are produced from said formation by the pressure gradients established when said second well is produced, and as often thereafter as is necessary to sustain production,
  (f) absent said propagation, venting from said one of said wells the combustion products from said igniting of step (d),
  (g) alternately and sequentially repeating steps (a), (c), (d), and (f), said preselected pressure of step (c) increasing a predetermined increment over the previous preselected pressure until a flash burning is propagated through the formation, and
  (h) repeating steps (a), (b), (c), and (d) until said hydrocarbonaceous material becomes flowable and hydrocarbons are produced from the formation by the pressure gradients established when said second well is produced, and as often thereafter as is necessary to sustain production.

2. The method of claim 1 wherein the subterranean formation is oil shale and the preselected pressure of step (c) is 100 p.s.i.a. and increases 50 p.s.i.a. after each successive igniting of step (d) and venting of step (f).

3. The method of claim 1 wherein the subterranean formation is an oil-containing formation and the preselected pressure of step (c) is 1000 p.s.i.a. and increases 100 p.s.i.a. after each successive igniting of step (d) and venting of step (f).

4. A method of recovering hydrocarbons from a subterranean formation containing hydrocarbonaceous material therein, and having small passageways running therethrough and communicating with at least one injection well and at least one production well penetrating said formation, which comprises the steps of:
  (a) injecting through said injection well a combustible mixture of a gaseous fuel and an oxygen-containing gas while producing said production well only when the pressure thereat reaches a minimum pressure necessary to sustain flash burning in the formation,
  (b) when said combustible mixture is produced at said production well, igniting said combustible mixture to effect flash burning in said formation whereby the formation adjacent the passageways is heated 5° to 25° F., and (c) repeating steps (a) and (b) until the in-situ hydrocarbonaceous material becomes flowable and hydrocarbons are produced from the formation by the pressure gradients established when the production well is produced, and as often thereafter as is necessary to sustain production.

5. The method of claim 4 wherein the small passageways are fissures and the minimum pressure of step (a) is given by FIGURE 2.

6. The method of claim 4 wherein the subterranean formation is an oil-containing formation having permeability and porosity empirically analogized to pore radii and the minimum pressure of step (a) is given by FIGURE 1.

7. A method of recovering hydrocarbons from a subterranean formation containing hydrocarbonaceous material therein, and having small passageways running therethrough and communicating with at least one injection well and at least one production well penetrating said formation, which comprises the steps of:
 (a) injecting through said injection well a gaseous combustible mixture until it is produced at said production well,
 (b) shutting said production well and continuing the injection of said combustible mixture until at least a minimum pressure adequate to sustain flash burning in the formation is achieved at said production well,
 (c) igniting said combustible mixture to effect a flash burning whereby the formation adjacent the passageways is heated 5° to 25° F.,
 (d) opening said production well for withdrawing hydrocarbons and combustion products, and
 (e) repeating the steps (a), (b), (c), and (d) until the in-situ hydrocarbonaceous material becomes flowable and hydrocarbons are produced from the formation by the pressure gradients established when said production well is opened, and as often thereafter as is necessary to sustain production.

8. The method of claim 7 wherein the subterranean formation is an oil-containing formation, and said minimum pressure adequate to sustain flash burning is indicated in FIGURE 1 from the physical properties of the formation and composition of said combustible mixture.

9. The method of claim 7 wherein the subterranean formation is a relatively impermeable formation having fissures running therethrough, and said minimum pressure adequate to sustain flash burning is indicated by FIGURE 2 from the width of the fissures, composition of said combustible mixture, and temperature of the formation.

10. In a method of recovering hydrocarbons from a subterranean formation having at least an injection well and a production well completed therein and wherein a secondary recovery process has been instituted by injecting at least one secondary recovery fluid into said injection well at a predetermined injectivity rate per unit pressure and wherein a liquid block has been indicated by the decrease of said injectivity rate per unit pressure below a predetermined level, the improvement which comprises injecting a gaseous combustible mixture into said production well while maintaining on said injection well a back pressure above a predetermined minimum pressure necessary to sustain flash burning in said formation until said combustible mixture is produced at said injection well, igniting said combustible mixture to flash burn said combustible mixture and heat uniformly said formation containing said combustible mixture thus increasing the mobility of the viscous hydrocarbons, repeating the injecting and igniting steps as necessary to heat the viscous hydrocarbons from 20° to 100° F. higher than their in-situ temperature, and injecting said secondary recovery fluid into said injection well.

11. A method of recovering hydrocarbons from a subterranean formation having at least an injection well and a production well completed therein and sufficiently impermeable that the in-situ hydrocarbons form a liquid block which renders in-situ burning inoperative as a secondary recovery technique, which method comprises the steps of:
 (a) initiating in-situ burning by injecting at a predetermined injectivity rate per unit pressure at least a combustion-supporting gas into the injection well,
 (b) when said injectivity rate per unit pressure falls below a predetermined level indicating liquid blocking, injecting a combustible mixture containing a gaseous fuel and oxygen into the production well while maintaining on the injection well a back pressure above a minimum pressure necessary to sustain flash burning in said formation thereby automatically sustaining flash burning cycles at repetitive intervals whereby the formation is heated 5° to 25° F. per cycle,
 (c) monitoring said flash burning cycles and continuing said injecting of said combustible mixture until at least 1 to 5 cycles have been effected, heating said formation and hydrocarbons 20° to 100° F., and
 (d) reinitiating in-situ burning.

12. The method of claim 11 wherein said formation is a conventional oil-containing formation and said minimum pressure of step (b) is determined by FIGURE 1 from physical properties of the formation and composition of said combustible mixture.

13. The method of claim 11 wherein said formation is a relatively impermeable formation having fissures running therethrough, and said minimum pressure of step (b) is determined by FIGURE 2 from the width of the fissures, composition of said combustible mixture, and temperature of the formation.

14. In a method of recovering hydrocarbons by in-situ burning techniques from a subterranean formation having at least an injection well and a production well completed therein and sufficiently impermeable that the in-situ hydrocarbons form a liquid block which renders in-situ burning inoperative as a secondary recovery technique, the improvement which comprises:
 (a) injecting a combustible mixture containing a gaseous fuel and oxygen into said production well and flowing through the formation until produced at said injection well,
 (b) closing said injection well and continuing said injecting until at least a minimum pressure necessary to sustain flash burning in said formation as indicated by FIGURE 1 is reached at said injection well, and
 (c) igniting said combustible mixture to effect flash heating whereby said liquid block and in-situ hydrocarbons are heated from 5° to 25° F. and rendered more mobile before starting in-situ burning.

15. A method of recovering hydrocarbons from a subterranean formation having at least an injection well and a production well completed therein and sufficiently impermeable that the in-situ hydrocarbons may form a liquid block which will render in-situ burning inoperative as a secondary recovery technique, which method comprises the steps of:
 (a) initiating in-situ burning by injecting, at an injectivity rate per unit pressure, at least a combustion-supporting gas into said injection well,
 (b) when said injectivity rate per unit pressure falls below a predetermined level indicating liquid blocking, injecting a combustible mixture containing a gaseous fuel and oxygen into said production well and flowing through the formation until produced at said injection well,
 (c) closing said injection well and continuing the injection of step (b) until at least a minimum pressure adequate to sustain flash burning in said formation as indicated by FIGURE 1 is reached at said injection well,
 (d) igniting said combustible mixture to effect flash burning in said formation whereby the liquid block and in-situ hydrocarbons are heated from 5° to 25° F. and rendered more mobile, (e) opening said injection well, and (f) reinitiating in-situ burning.

16. The method of claim 15 wherein steps (b), (c), (d), and (e) are repeated until the temperature is raised between 20° and 100° F.

17. A method of recovering hydrocarbons from a subterranean formation having at least an injection well and a production well completed therein and sufficiently impermeable that the in-situ hydrocarbons form a liquid block which renders in-situ burning inoperative as a secondary recovery technique, which method comprises the steps of:

(a) initiating in-situ burning by injecting, at an injectivity rate per unit pressure, at least a combustion-supporting gas into said injection well until said injectivity rate per unit pressure falls below 10 percent of its initial level indicating liquid blocking, (b) injecting a combustible mixture containing a gaseous fuel and oxygen into said production well and flowing through said formation until produced at said injection well, (c) closing said injection well and continuing the injection of step (b) until at least a minimum pressure adequate to sustain flash burning in said formation as indicated in FIGURE 1 is reached at said injection well, (d) igniting the combustible mixture to effect flash burning in said formation whereby the liquid block and in-situ hydrocarbons are heated from 5° to 25° F. and rendered more mobile, (e) opening said injection well and repeating steps (b), (c), and (d) until the temperature of said formation is raised between 20° and 100° F., and (f) cyclically repeating steps (a), (b), (c), (d), and (e) as necessary to bring about more nearly complete recovery of relatively viscous hydrocarbons from the formation.

18. A method of enhancing the recovery of hydrocarbons from hydrocarbonaceous material contained in a subterranean formation having small passageways running therethrough and in communication with an injection and a production well penetrating said formation, comprising the steps of:

(a) injecting into said formation through said injection well a gaseous combustible mixture until it is produced at said production well, (b) restricting fluid flow from said production well and continuing the injection of said combustible mixture into said injection well until at least a minimum pressure adequate to sustain flash burning in said formation is achieved at said production well, said minimum pressure for said combustible mixture being indicated by FIGURES 1 and 2 where physical properties of the small passageways in said formation in which flash burning must occur provide (1) permeability and porosity empirically analogized to pore radii in a conventional oil-bearing formation and (2) width of fissures running through a relatively impermeable formation, respectively, (c) igniting said pressurized combustible mixture to effect flash burning of same for heating said formation and increasing the mobility of hydrocarbons obtained from said hydrocarbonaceous material, and (d) withdrawing fluids from said formation through said production well after practicing the preceding steps (a), (b), and (c) until said hydrocarbons obtained in step (c) become sufficiently flowable so as to be producible from said formation by the pressure gradients established about said production well.

References Cited by the Examiner
UNITED STATES PATENTS

| | | | |
|---|---|---|---|
| 2,901,043 | 8/1959 | Campion et al. | 166—11 |
| 3,110,345 | 11/1963 | Reed et al. | 166—11 |
| 3,115,928 | 12/1963 | Campion et al. | 166—11 |

CHARLES E. O'CONNELL, *Primary Examiner.*

S. J. NOVOSAD, *Assistant Examiner.*